US008872884B2

(12) United States Patent
Robertson (10) Patent No.: US 8,872,884 B2
(45) Date of Patent: Oct. 28, 2014

(54) SYSTEM AND METHOD FOR COMBINING INSTANT MESSAGING AND VIDEO COMMUNICATION SYSTEMS (75) Inventor: Jeffrey S. Robertson, Wyckoff, NJ (US)

(73) Assignee: Vidyo, Inc., Hackensack, NJ (US)

( * ) Notice: Subject to any disclaimer, the term of this patent is extended or adjusted under 35 U.S.C. 154(b) by 186 days.

(21) Appl. No.: 13/487,008

(22) Filed: Jun. 1, 2012

(65) Prior Publication Data
US 2012/0274725 A1 Nov. 1, 2012

Related U.S. Application Data (63) Continuation of application No. PCT/US2010/058801, filed on Dec. 2, 2010.

(60) Provisional application No. 61/266,051, filed on Dec. 2, 2009.

(51) Int. Cl.
H04N 7/14 (2006.01)
H04N 7/15 (2006.01)
H04L 12/18 (2006.01)
H04L 12/58 (2006.01)
H04M 3/56 (2006.01)
H04M 3/42 (2006.01)

(52) U.S. Cl.
CPC ......... *H04N 7/15* (2013.01); *H04M 2203/4536* (2013.01); *H04L 12/1818* (2013.01); *H04M 2203/652* (2013.01); *H04M 2203/5054* (2013.01); *H04L 12/581* (2013.01); *H04M 3/42382* (2013.01); *H04L 51/04* (2013.01); *H04M 3/56* (2013.01)
USPC .................. 348/14.08; 348/14.09; 348/14.12; 348/14.01

(58) Field of Classification Search
CPC ........ H04N 7/14; H04N 7/15; H04L 12/1818; H04L 12/581; H04L 51/04; H04M 3/56; H04M 3/42382; H04M 2203/4536; H04M 2203/5054; H04M 2203/652
USPC .................... 348/14.01–14.16; 370/260–261; 709/204
See application file for complete search history.

(56) References Cited

U.S. PATENT DOCUMENTS

| 5,886,691 A | 3/1999 | Furuya et al. |
| 7,593,032 B2 | 9/2009 | Civanlar et al. |
| 2003/0174202 A1 | 9/2003 | Eshkoli et al. |
| 2005/0021645 A1 | 1/2005 | Kulkarni et al. |

(Continued)

FOREIGN PATENT DOCUMENTS

| JP | 2003-324705 | 11/2003 |
| JP | 2005-109929 | 4/2005 |

(Continued)

OTHER PUBLICATIONS

U.S. Appl. No. 14/023,674, filed Sep. 11, 2013.
International Search Report and Written Opinion for PCT/US10/058801, dated Jan. 24, 2011 (corresponds to U.S. Appl. No. 13/487,008).

(Continued)

Primary Examiner — Melur Ramakrishnaiah
(74) Attorney, Agent, or Firm — Baker Botts L.L.P.

(57) ABSTRACT

A method and apparatus for initiating videoconferences in instant messaging systems is described, including posting of a videoconference URL in the instant messaging chat window if any of the desired participants of the videoconferencing session is unavailable, so that the unavailable participants can simply click on the videoconference URL and join the videoconferencing session.

8 Claims, 11 Drawing Sheets

(56) References Cited

U.S. PATENT DOCUMENTS

| | | |
|---|---|---|
| 2005/0034079 A1 | 2/2005 | Gunasekar et al. |
| 2005/0289471 A1 | 12/2005 | Thompson et al. |
| 2006/0009243 A1 | 1/2006 | Dahan et al. |
| 2006/0123082 A1 | 6/2006 | Digate et al. |
| 2008/0132215 A1* | 6/2008 | Soderstrom et al. .......... 455/416 |
| 2009/0132653 A1* | 5/2009 | Niazi ............................ 709/204 |
| 2010/0138450 A1 | 6/2010 | Fishman et al. |
| 2010/0180211 A1 | 7/2010 | Boyd |
| 2011/0093548 A1 | 4/2011 | Das et al. |

FOREIGN PATENT DOCUMENTS

| | | |
|---|---|---|
| JP | 2007-516674 | 6/2007 |
| JP | 2007-189689 | 7/2007 |
| JP | 2007-534266 | 11/2007 |
| JP | 2009-043201 | 2/2009 |

OTHER PUBLICATIONS

International Search Report and Written Opinion for PCT/US2013/059313, dated Mar. 27, 2014.

* cited by examiner

FIG. 1: Instant Messaging System (Prior Art)

FIG. 2: Videoconferencing System (Prior Art)

(a)

(b)

FIG. 3: Combined IM and VC System

FIG. 4: Client System Architecture

FIG. 5: Videoconference Call Initiation Flow Diagram (continued in next page)

(FIG. 5 continued)

FIG. 6: Screenshots from Vidyo's Portal, setting up a room URL (a)

(b)

FIGS. 7A-E: Screen snapshots from Vidyo's Plug-in for Microsoft® Office Communicator

SYSTEM AND METHOD FOR COMBINING INSTANT MESSAGING AND VIDEO COMMUNICATION SYSTEMS

CROSS-REFERENCE TO RELATED APPLICATION

This application is a continuation of International Patent Application Serial No. PCT/US2010/058801 filed Dec. 2, 2010 and claims priority to U.S. Provisional Application Ser. No. 61/266,051, filed on Dec. 2, 2009, the contents of both of which are hereby incorporated by reference in their entireties herein.

FIELD

The present invention relates to personal communication, and specifically digital communication using instant messaging as well as digital audio and video.

BACKGROUND

Instant messaging systems have proliferated over the past several years, with several commercial offerings available today. These systems offer individual users the ability to communicate with other users using text, audio, video, and other types of multimedia data. Examples include free offerings such as Skype and Google Talk, as well as commercial, enterprise systems such as the Microsoft Office Communication Server (hereinafter 'OCS') and its associated client Microsoft Office Communicator.

Typically, such systems provide a so-called "presence engine" as well as the ability to communicate via text-based messages. The presence engine is responsible for registering the status of a user (e.g., available to communicate, idle, unavailable, etc.) and reporting it to other users (co-workers, users declared in the system as 'friends' of the specific user). A user can typically initiate communication just by typing a text message in a window, addressed to another user. The intended recipient of the message will be notified by the software and will be offered the opportunity to reply. These systems are referred to as "Instant Messaging" or IM systems.

Most IM systems offer the ability to conduct text-based conversations among groups of users, i.e., with groups of more than two users at a time. Several IM systems offer the ability to combine the text-based communication with audio communication whereas others offer the ability to use video as well.

Due to the complexity in offering multi-point video communication, most systems allow multi-user audio communication (e.g., Skype or Google Talk) but only person-to-person video communication. The technical problems in multi-point video are significant, especially when desktop operation is desired (a requirement for an IM system).

Vidyo, Inc. ('Vidyo') has developed a solution for videoconferencing which surmounts the technical challenges associated with low-delay, multi-point video communication on the desktop. Using Scalable Video Coding and the so-called Scalable Video Communication Server (SVCS) architecture implemented in Vidyo's VidyoRouter™ system and described in part in commonly assigned U.S. Pat. No. 7,593,032, incorporated herein by reference in its entirety, the Vidyo system allows telepresence-quality multi-point video communication even from regular PC and Mac desktops. It is thus suitable for use in a desktop-based IM system.

A problem, however, is that the Vidyo system—like any videoconferencing-only system—is a system designed and implemented separately from the IM system. It is therefore desirable to provide a system and method through which a multi-point video and audio communication system can be seamlessly integrated with the operation of an IM system, so that a user would not even perceive that two different systems are actually used.

SUMMARY

A method and apparatus for initiating a videoconference between an initiating user and one or more selected users in an instant messaging system that uses a videoconference URL are disclosed herein. In an exemplary embodiment, the videoconference URL is uniquely associated with the initiating user or his resources on the videoconferencing system. Specifically, if any of the one or more selected users is not available to be added to the videoconference, the videoconference URL is posted in the instant messaging chat window between the initiating user and the one or more selected users. This way, anyone of the one or more selected users that may not be available to be added to the videoconference (because he is in another videoconference or because he is not registered on the videoconference system) can simply click on the URL to join the videoconference session.

BRIEF DESCRIPTION OF THE DRAWINGS

Further features, the nature, and various advantages of the present invention will be more apparent from the following detailed description of the exemplary embodiments and the accompanying drawings in which:

FIG. 2A-B is a schematic illustration of a background art exemplary videoconferencing system;

FIG. 6A-B provides exemplary screen snapshots from Vidyo's portal during the process of creating a room URL;

FIG. 7A-E provides exemplary screen snapshots from an exemplary embodiment of the present invention in the form of Vidyo's plug-in for Microsoft® Office Communicator

The Figures are incorporated and constitute part of this disclosure. Throughout the Figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION

Figure 1:
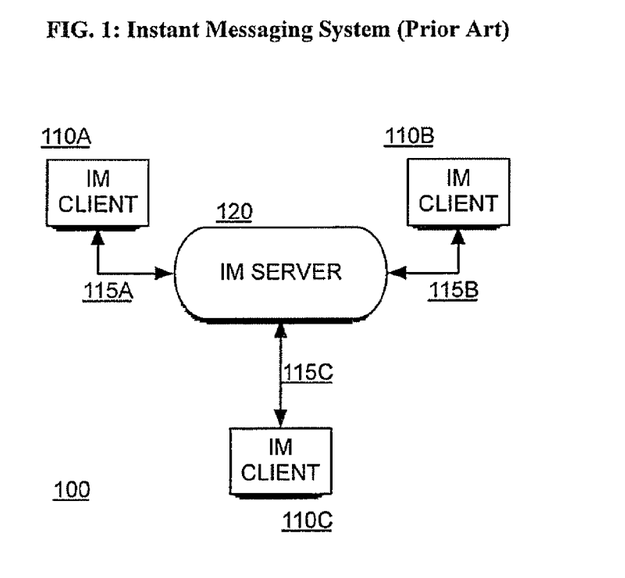
FIG. 1 is a schematic illustration of a background art exemplary instant messaging system.

FIG. 1 depicts the architecture of a typical IM system 100. The system consists of an IM Server 120 and one or more users that employ IM Client systems 110. In the figure three such clients are shown (110A, 110B, and 110C), but any number of clients can be used. The IM Clients 110 are connected to the IM Server 120 through a network over connections 115. In an exemplary embodiment of the present invention a packet-based network using the Internet Protocol (IP) is used, but other types of networks are also possible.

The IM Client 110 can be standalone software installed and running on a user's computer, or it can be a web page that is loaded from the IM Server 120 (or another server) onto a user's browser. In the latter case the connections 115 may not be over a network, but instead within the IM Server 120.

In an IM system such as the one shown in FIG. 1, users employ their IM Client 110 to log in to the IM Server 120 that registers their name and availability. In other words, a user connects to the IM system stating that it is user, for example, 'bob', and provides a password. During the time the user remains logged in, the system will consider the user available for communication. The user may be given the option to select the type of 'status' that he or she wants the system to report. For example: away, not available, do not disturb, invisible, and offline. One example of an IM system is the Microsoft® Office Communications Server with the Office Communicator client.

FIG. 2(a) depicts the architecture of a typical videoconferencing system 200, such as the system offered commercially by Vidyo. The system has one or more VC Servers 220 and one or more VC Clients 210. Three such clients are shown in the figure (A, B, and C), with a single VC Server for purposes of illustration—an exemplary embodiment of the present invention can be directly used in the case where multiple VC Servers 220 are present. The VC Clients 210 and the VC Server 220 are connected via network connections 218 (A through C). In an exemplary embodiment of the present invention the IP protocol is used for the underlying network. The VC Client 210 can be a standalone system such as a VidyoRoom system, which is a computer-based system with a camera and one or more displays, or it can be a software that is downloaded and ran on a user's computer, such as the VidyoDesktop software.

FIG. 2(b) depicts the architecture of the VC Server 220. The server includes two components, a Portal 230 and a Core 240. In an exemplary embodiment of the present invention, the Portal 230 is a web-based registration service, where users log in and through which they can initiate, receive, or control videoconferencing calls. The VC Server 220 also includes the Core 240 module, which is the component that receives, processes, and forwards media. As shown in the figure, the information carried over network connection 218 is split between the Portal 230 and the Core 240, with media data flowing to/from the Core 240, and user/session management data flowing to/from the Portal 230.

The Portal 230 and Core 240 communicate through a connection 258. Although the VC Server is shown as a single unit, the Portal 230 and Core 240 can be hosted on distinct systems that may even be physically in different locations. In that case the connection 258 is over the network, rather than being an internal connection within a single system.

In an exemplary embodiment of the present invention, the VC Server Core is a Scalable Video Communication Server (SVCS), as described in part in U.S. Pat. No. 7,593,032 and as implemented in the VidyoRouter™ system. Alternative VC Server Core architectures include the traditional switching Multipoint Control Unit (MCU) or the transcoding MCU.

Figure 2:
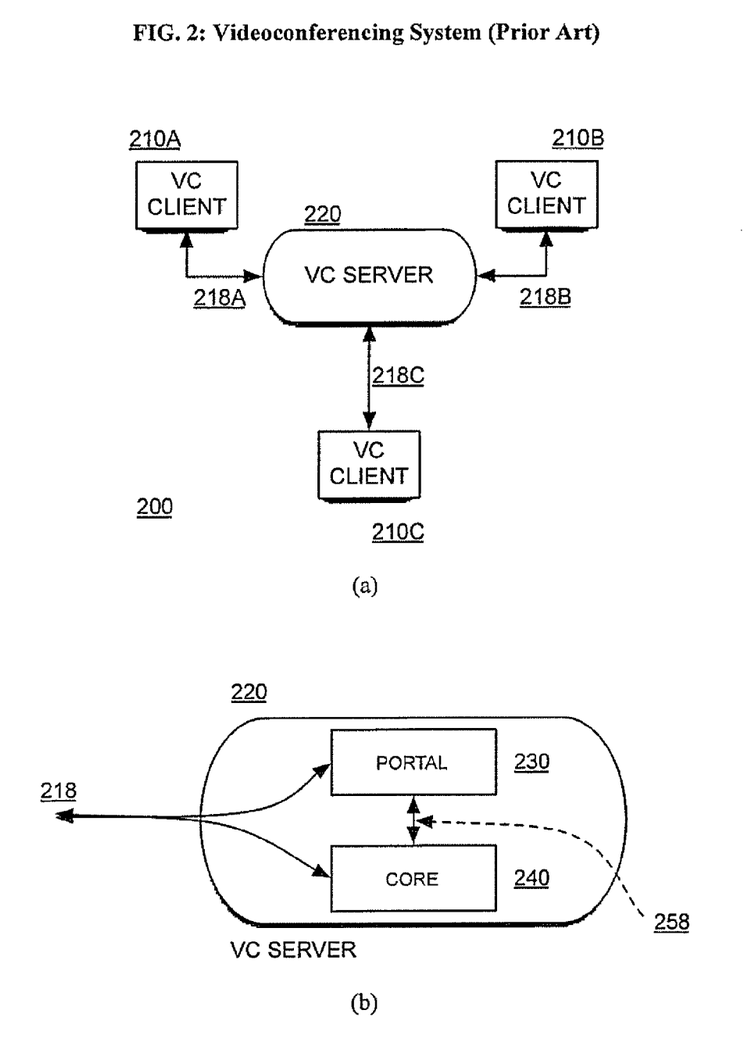
Figure 3:
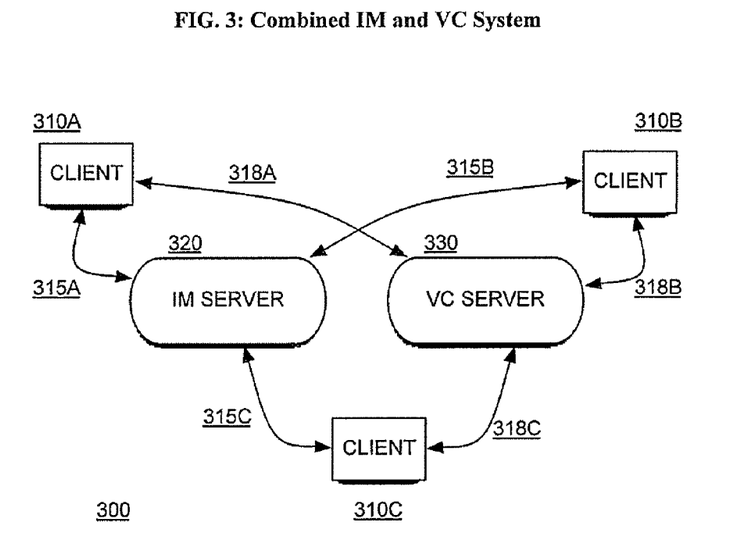
FIG. 3 is a schematic illustration of an exemplary system combining instant messaging and videoconferencing functionality in accordance with an aspect of the present invention.

FIG. 3 depicts an integrated IM and VC system 300 in accordance with an embodiment of the present invention. As shown in the figure, the system has two servers, an IM Server 320 and a VC Server 330. One or more Clients 310, in this example three (A through C), are connected to both servers using corresponding connections 315 and 318, respectively. The IM Server 320 and VC Server 330 operate as with the standalone systems shown in FIG. 1 and FIG. 2, respectively. In other words the system is really two combined systems, an IM system and a VC system. Whereas the servers here are identical to the servers used in traditional, standalone IM and VC systems, the difference lies in the architecture and operation of the Client 310.

Figure 4:
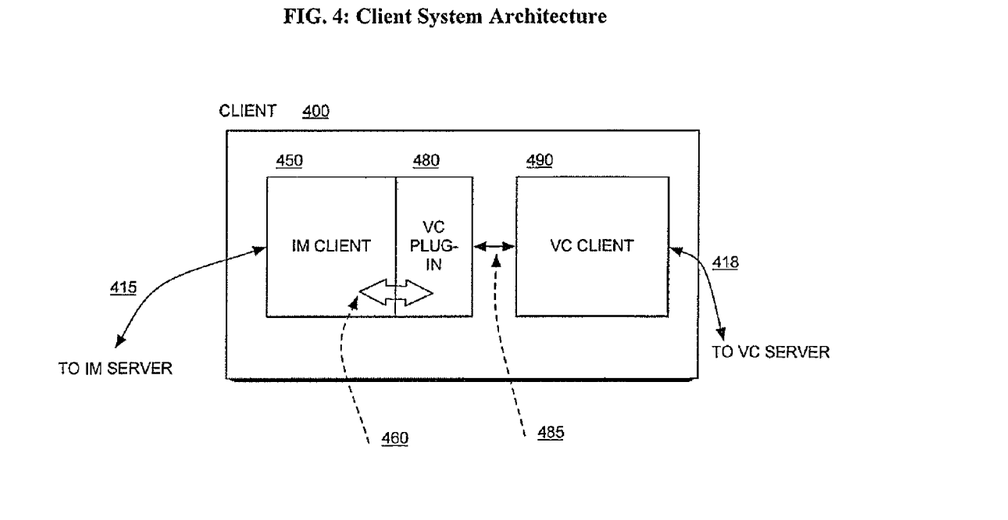
FIG. 4 is a schematic illustration of the client system architecture in accordance with an aspect of the present invention.

FIG. 4 shows the Client system architecture in accordance with an embodiment of the present invention. The Client 400 contains an IM client module 450 and a VC client module 490. The IM client module 450 operates as an IM Client, in the same way as the IM Client(s) shown in FIG. 1. Similarly, the VC client module 490 operates as a VC Client in the same way as the VC Client(s) shown in FIG. 2. The Client 400 also includes a VC Plug-in module 480 which provides videoconferencing system integration, as discussed in detail later on. The VC Plug-in module 480 and the IM client module 450 communicate through the plug-in interface 460. This interface is defined by, and provided from, the IM system manufacturer. It allows third-party code, such as the VC Plug-in module 480, to integrate with the IM client and augment the base IM client functionality. In an exemplary embodiment of the present invention where the Microsoft® Office Communicator is used, the plug-in interface 460 is COM-based. It is also possible of course that the VC Plug-in module 480 is integrated into the IM client module 450 as a single entity by the IM system manufacturer, in which case the distinction between the modules is functional rather than structural.

The VC Plug-in module 480 also communicates with the VC Client module 490 through the interface 485. In an exemplary embodiment of the present invention where the Vidyo system is used, the interface 485 is HTTP-based.

Notice that the IM client module 450 communicates with the IM server via the connection 415, whereas the VC client module 490 communicates with the VC Server via the connection 418. The VC Server interface through the connection 418 in an exemplary embodiment of the present invention where the Vidyo system is used is SOAP-based.

Although the VC Client module 490 is shown here as part of the Client 400, it is noted that this is only a logical association. Indeed, the VC Client module 490 could be in the same computer system as the IM Client 450 and VC Plug-in 480, or it could be in a different system, possibly even at a different physical location. Indeed, the fact that the VC Client module 490 communicates with the rest of the system through connections 485 and 418, makes the actual physical location of the VC Client module 490 irrelevant. A significant benefit of this architecture is that the VC Client module 490 could be a standalone videoconferencing system such as the VidyoRoom series of systems. In this case the videoconference could run on a separate computer system than the IM Client 450, but the process of initiating the videoconference from the IM system, as disclosed below, would be identical.

When the Client 400 system is operated, it should be provided with the login credentials of the user on the IM and VC systems of FIG. 3. Indeed, the IM Server 320 and the VC Server 330 may offer completely different log in systems (e.g., with user credentials originating from different databases). In an exemplary embodiment of the present invention the user name is identical in both systems. This simplifies the implementation because the system does not have to maintain a mapping database between user names on the IM system and user names on the VC system. But if necessary, such a database could be used.

Figure 6:
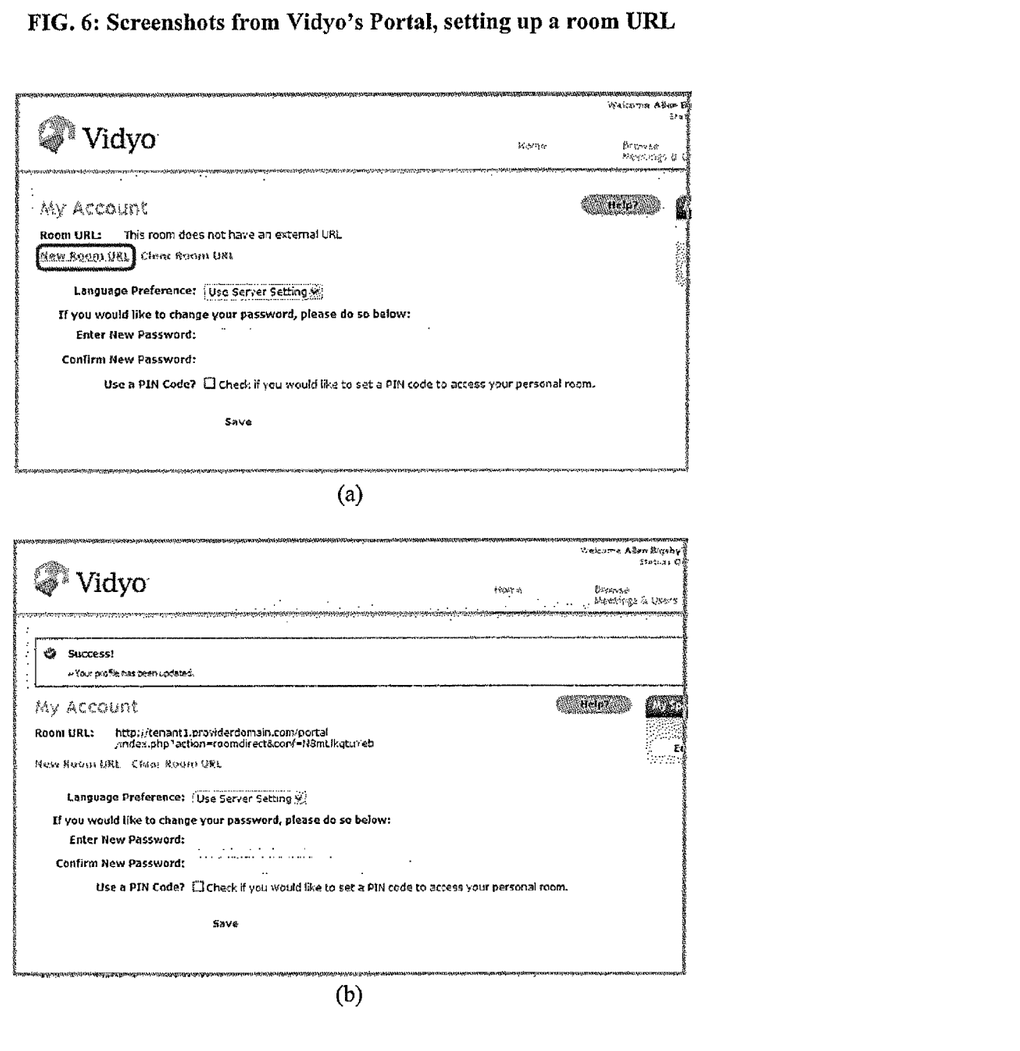

We now describe the operation of the Client 400 with reference to FIG. 6 and FIG. 7. These figures show snapshots from an exemplary embodiment of the present invention on the Vidyo platform and the Microsoft® Office Communicator platform.

We first note that the Vidyo system, allows logged in users to start up videoconferencing calls and invite guest users to join them, even if they do not have log in privileges on the videoconferencing system portal. These users can utilize a special URL generated by the portal for the particular user that is conducting the videoconferencing call. The URL is associated with the user's "room", i.e., a logical entity offered by the portal where any registered user can freely join in (unless the "room" is protected by a PIN or password). Rooms are the logical entity in which multi-point videoconferencing sessions take place in the Vidyo system. Accessing that room URL enables anyone to log in as "guests" into the system, install the VC client software if not already installed and running, and connect to the conference call of the particular user. This enables registered users to conduct conference calls with any user, whether he is registered on the VC system or not. This is shown in FIGS. 6(a) and (b) where the "My Account" page is shown as produced by the portal; in figure (a) there is no URL yet created, whereas in figure (b) the URL has been created and is now available for use.

We also note that the Vidyo system further provides the client software automatically through the portal, so that the users do not have to pre-install software in advance of making a call. The user is prompted to download the software after connecting to the portal through the URL, if the software is not already available and running on the user's computer.

With reference now to FIG. 7, we assume that a user (in this example, "Allen Bigsby," with the email address "abigsby@vidyo.com") is logged in on the IM system and wants to add video to the existing communication session. The login process is shown in FIG. 7(a). After logging in, the user sees the main IM client Graphical User Interface (GUI), as shown in FIG. 7(b).

Figure 7A:
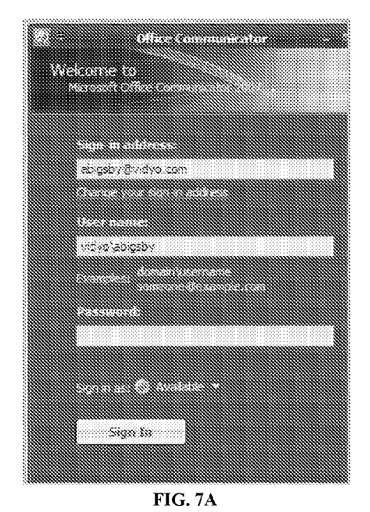
Figure 7B:
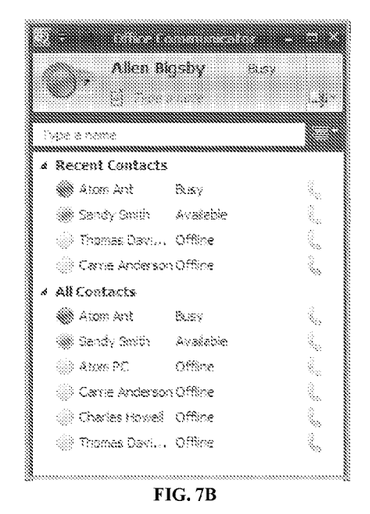
Figure 7C:
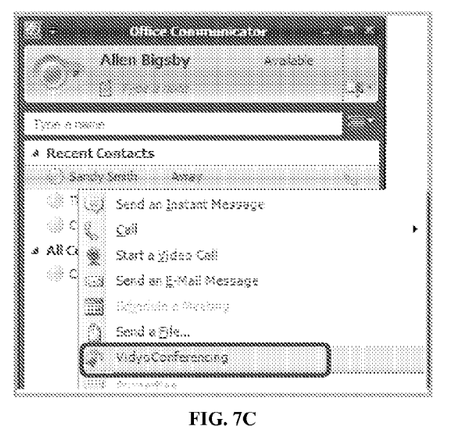
Figure 7D:
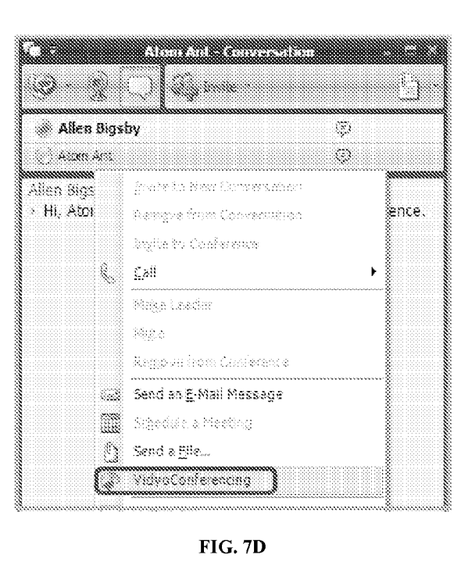

We assume that the IM user that wants to activate video in the current session is a user that is already registered with the Vidyo portal. When a user wants to initiate a videoconferencing call for the current session, he uses an add-on menu entry in the IM client module 460 GUI. This menu entry is added by the VC Plug-in module 480. FIG. 7(c) shows this additional menu entry in the main GUI ("VidyoConferencing" menu entry), whereas FIG. 7(d) shows this additional menu entry in the Conversation window of the IM client module 460 GUI.

After the video call menu entry is selected, the VC plug-in module 480 will obtain the user names of all selected participants of the IM session. This is accomplished through the plug-in interface 460 shown in FIG. 4. The VC plug-in module will then examine if the user is already in a conference call. In an exemplary embodiment of the present invention where the Vidyo system is used this is done by examining Windows registry entries that are managed by the VC Client 490. If the user is in a call that he does not own, i.e., it was not initiated by him, then the system does not proceed with the videoconferencing call. If the user is not in a conference, the VC plug-in module 480 will first initiate a conference. In an exemplary embodiment of the present invention, the VC plug-in module 480 obtains a security key from the Windows registry, placed there by the VC Client 490, so that it can connect to the VC Server directly on behalf of the VC Client 490. In an alternative embodiment of the present invention, the VC plug-in module 480 could instruct the VC Client 490 to initiate the conference.

After the conference is initiated, or if the user was already in a conference that he had previously initiated, then the VC plug-in module 480 will communicate with the Portal 230, in order to invite each of the selected users as participants. It is assumed that the user is already logged in on the Portal 230. The VC plug-in module 480 uses the IM user names of the other users to locate them in the Portal 230. If these users are not currently logged in on the Portal 230, if they do not have accounts on the Portal 230, or if they are already in videoconferences, then the system will report them as unavailable.

Figure 7E:
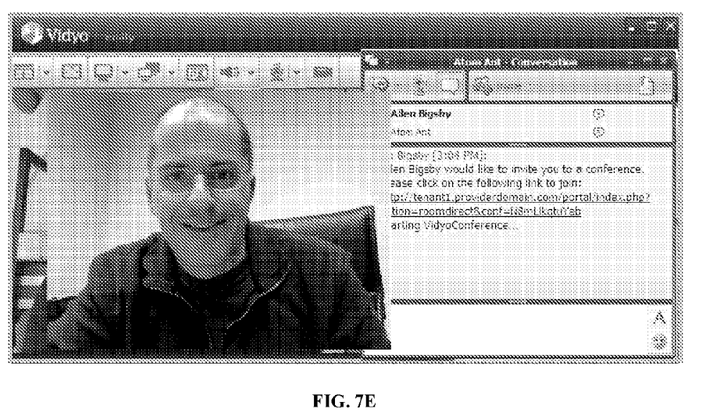

In an embodiment of the present invention, if one or more of the invited users is reported as unavailable, the URL generated by the Portal 230 for the particular videoconferencing call in order to allow the unavailable or unregistered users to join in the call will then be used. The URL is generated by the Portal 230, is obtained by the VC client module 480, and is communicated to the remaining participants via the IM communication channels) that already exist between the initiating user and the other participants. The URL can be created by the Portal 230 in advance, or it may be created on demand, when required for inviting unavailable users. This is shown in FIG. 7(e), which shows the Conversation window of the IM Client module 450 for user "emily", where the URL of the videoconferencing session has been posted by the VC plug-in module 480 of user "Allen Bigsby" (through his IM client module 450) together with an informative message ("Allen Bigsby would like to invite you to a conference. Please click on the following link to join: . . . ").

The users who are either not logged in or not registered on the video portal, can then simply click on this URL on their IM client software window so that their web browser directs them to the Portal 230, in order to install the videoconferencing software, if needed, and to join the initiated videoconferencing session. Furthermore, users who are logged in on the Portal 230 but are in ongoing videoconferences will get to see the invitation on the IM client interface, and can decide whether or not they want to terminate their current videoconferencing session in order to join the new one they are invited on.

Figure 5:
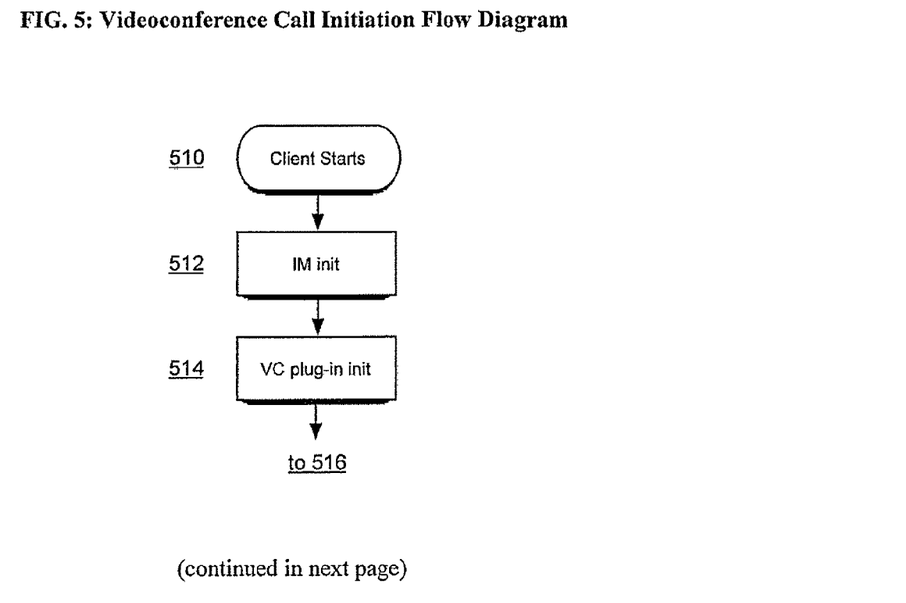
FIG. 5 is a flow diagram of the videoconferencing call initiation process.

FIG. 5 shows a detailed flow diagram of the videoconferencing session initiation process. In step 510 the Client is started. Then in step 512 the IM Client is initialized and the user (user A) is asked to login to the IM system. In step 514 the VC plug-in is initialized and attached to the IM client. The system then enters an input-waiting mode in step 516.

When the user presses the videoconferencing button in 518, the VC plug-in will obtain the names of the currently selected IM users B1 through Bn in step 520. The VC plug-in will check if the current user A is currently in a conference in step 522. If the user A is not in a conference, then the VC plug-in will start one at the VC server. If the current user A is in a conference, the VC plug-in will check if that conference is "owned" by user A. Ownership here means that user A has the authority to add or remove participants in the conference. In the Vidyo system, each user is associated with his own "room", in which he has full control in terms of who can join. If the current conference is not owned by A, then the system cannot initiate a new videoconference for A and the algorithm proceeds to step 516, waiting for user input.

Regardless if a new conference is created for A or if A is already in a videoconference that he owns, the VC plug-in next makes a request to the VC Portal to add the selected users B1 through Bn. The request can be done sequentially, one user at a time, or it can be done as a single request. In an exemplary embodiment of the present invention, the VC plug-in makes such requests sequentially. The VC portal responds with one of the following status messages: 1) successfully invited, 2) not logged, and 3) busy (in a conference already). We group the last two categories into a single one, in which the user is considered 'unavailable'.

If any one of the invited users B1 through Bn is unavailable, as examined in step 530, the VC plug-in posts the conference URL obtained from the VC portal onto the IM chat window in step 532, together with an informative message that the users are invited to join a videoconference (see, e.g., FIG. 7(*e*)). The VC plug-in then goes back to the waiting state of step 516.

We note that this process only takes care of the videoconference initiation process. After a conference is started, the IM chat portion and the VC portion of the system operate independently. In an exemplary embodiment of the present invention the VC plug-in reports the videoconference status on the IM system. Microsoft® Office Communicator R1 allows the use of custom "status" messages, such as "In VidyoConference". The next release, OC R2, removed that capability, and only allows the VC plug-in to indicate that the user is "Busy", if the user is engaged in a videoconference initiated by the IM client.

The disclosed subject matter allows the initiation of multipoint videoconferencing calls with greatly reduced user involvement. In an exemplary embodiment, the VC client module 480 just registers a "video call" menu option or button on the IM client module 460 GUI. This way the initiating user only has to click a single button to initiate the videoconferencing call. On the remote end, users that are already registered and logged in on the separate video Portal 230 will be directly connected to the initiated call. Most significantly, users that are not registered or logged in on the video Portal 230 only have to click on the Portal URL to enter the videoconferencing call.

In an alternative embodiment of the present invention, it is possible that instead of having the VC client module 480 communicate directly with the video Portal 230, the IM Server 320 instead is extended so that it communicates with the video portal. The videoconferencing session could then be setup by the IM server (at the request of one of the users).

The system and method described herein is not limited to adding audiovisual communication to IM systems, but can rather be used for any system or service that can be accessed via a URL. In other words, the text messaging ability of IM systems coupled with the presence engine can be used as a conveyor of activation or command strings for various different types of services. It is further noted that URL strings are not limited to just those of the "http" protocol, but can include standard or even proprietary protocol indicators (e.g., 'ftp', 'call', 'sip', etc.).

While in the exemplary embodiment the URL will initiate a software download which, in turn, will cause the downloaded software to connect to the videoconferencing session, in alternative embodiments the URL can instruct existing software (i.e., software that is already installed on the user's computer as an additional application or part of the operating system) to connect to the videoconferencing session. For example, a 'canto' protocol indicator in a URL (e.g., "callto: service.vidyo.com/bob") would cause the program registered to handle the "callto" URL on the user's computer to make a connection to the server service.vidyo.com and contact user 'bob').

It will be understood that in accordance with the disclosed subject matter, the techniques described herein can be implemented using any suitable combination of hardware and software. The software (i.e., instructions) for implementing and operating the aforementioned videoconferencing initialization techniques can be provided on computer-readable media, which can include, without limitation, firmware, memory, storage devices, microcontrollers, microprocessors, integrated circuits, ASICs, on-line downloadable media, and other available media.

Computer System

The methods for combining instant messaging and video communication systems described above can be implemented as computer software using computer-readable instructions and physically stored in computer-readable medium. The computer software can be encoded using any suitable computer languages. The software instructions can be executed on various types of computers. For example, FIG. 8 illustrates a computer system 800 suitable for implementing embodiments of the present disclosure.

Figure 8:
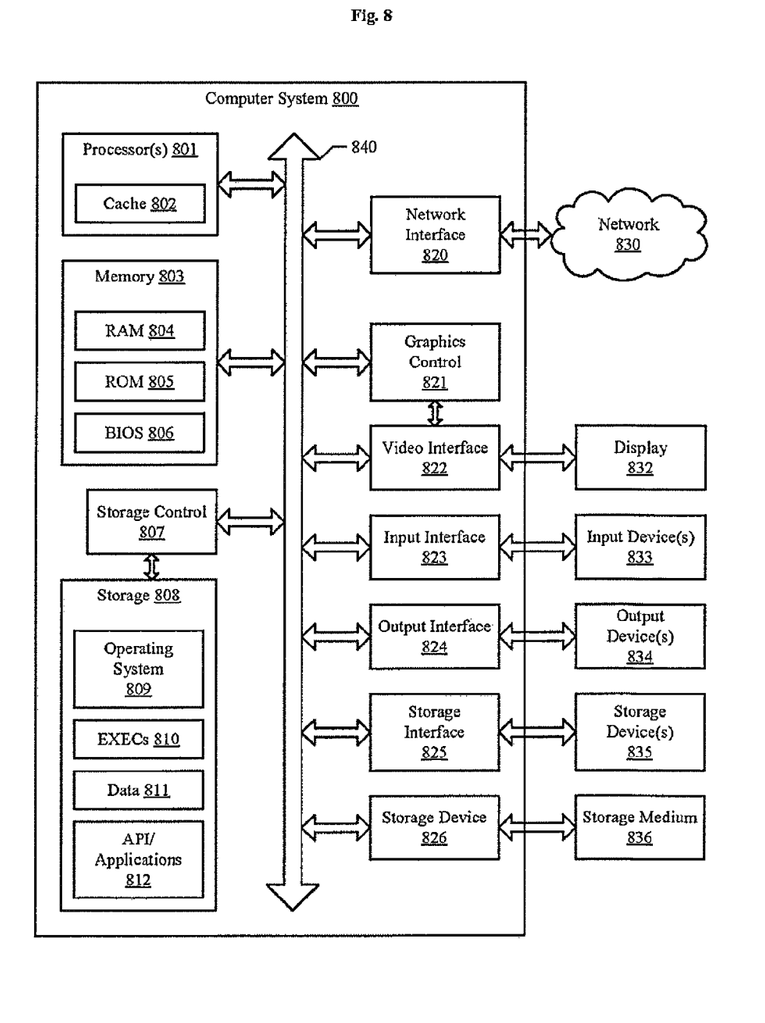
FIG. 8 shows a computer system for implementing an embodiment of the present invention.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 800 can have many physical forms including an integrated circuit, a printed circuit board, a small handheld device (such as a mobile telephone or PDA), a personal computer or a super computer.

Computer system 800 includes a display 832, one or more input devices 833 (e.g., keypad, keyboard, mouse, stylus, etc.), one or more output devices 834 (e.g., speaker), one or more storage devices 835, various types of storage medium 836.

The system bus 840 link a wide variety of subsystems. As understood by those skilled in the art, a "bus" refers to a plurality of digital signal lines serving a common function. The system bus 840 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 801 (also referred to as central processing units, or CPUs) optionally contain a cache memory unit 802 for temporary local storage of instructions, data, or computer addresses. Processor(s) 801 are coupled to storage devices including memory 803. Memory 803 includes random access memory (RAM) 804 and read-only memory (ROM) 805. As is well known in the art, ROM 805 acts to transfer data and instructions uni-directionally to the processor(s) 801, and RAM 804 is used typically to transfer data and instructions in a bi-directional manner. Both of these types of memories can include any suitable of the computer-readable media described below.

A fixed storage 808 is also coupled bi-directionally to the processor(s) 801, optionally via a storage control unit 807. It provides additional data storage capacity and can also include any of the computer-readable media described below. Storage 808 can be used to store operating system 809, EXECs 810, application programs 812, data 811 and the like and is typically a secondary storage medium (such as a hard disk) that is slower than primary storage. It should be appreciated that the information retained within storage 808, can, in appropriate cases, be incorporated in standard fashion as virtual memory in memory 803.

Processor(s) 801 is also coupled to a variety of interfaces such as graphics control 821, video interface 822, input interface 823, output interface, storage interface, and these interfaces in turn are coupled to the appropriate devices. In general, an input/output device can be any of video displays, track balls, mice, keyboards, microphones, touch-sensitive displays, transducer card readers, magnetic or paper tape readers, tablets, styluses, voice or handwriting recognizers, biometrics readers, or other computers. Processor(s) 801 can be coupled to another computer or telecommunications network 830 using network interface 820. With such a network interface 820, it is contemplated that the CPU 801 might receive information from the network 830, or might output information to the network in the course of performing the above-described method. Furthermore, method embodiments of the present disclosure can execute solely upon CPU 801 or can execute over a network 830 such as the Internet in conjunction with a remote CPU 801 that shares a portion of the processing.

According to various embodiments, when in a network environment, i.e., when computer system 800 is connected to network 830, computer system 800 can communicate with other devices that are also connected to network 830. Communications can be sent to and from computer system 800 via network interface 820. For example, incoming communications, such as a request or a response from another device, in the form of one or more packets, can be received from network 830 at network interface 820 and stored in selected sections in memory 803 for processing. Outgoing communications, such as a request or a response to another device, again in the form of one or more packets, can also be stored in selected sections in memory 803 and sent out to network 830 at network interface 820. Processor(s) 801 can access these communication packets stored in memory 803 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

As an example and not by way of limitation, the computer system having architecture 800 can provide functionality as a result of processor(s) 801 executing software embodied in one or more tangible, computer-readable media, such as memory 803. The software implementing various embodiments of the present disclosure can be stored in memory 803 and executed by processor(s) 801. A computer-readable medium can include one or more memory devices, according to particular needs. Memory 803 can read the software from one or more other computer-readable media, such as mass storage device(s) 835 or from one or more other sources via communication interface. The software can cause processor(s) 801 to execute particular processes or particular parts of particular processes described herein, including defining data structures stored in memory 803 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosed subject matter. It should also be noted that there are many alternative ways of implementing the methods and apparatuses of the disclosed subject matter.

What is claimed is:

1. A method of initiating a videoconference between an initiating user and one or more selected users of an instant messaging system, the method comprising:
   receiving a request from the initiating user to create a videoconference between himself and the one or more selected users;
   verifying that the initiating user is not in a videoconference or is in a videoconference that he is allowed to manage;
   if the initiating user is not a videoconference, starting a new videoconference;
   if the videoconference does not have an associated URL, requesting that an associated videoconference URL is created;
   obtaining the associated videoconference URL;
   requesting that the one or more selected users are added to the videoconference;
   checking if any of the one or more selected users is unavailable to be added to the videoconference; and
   if any of the one or more selected instant messaging system users is unavailable to be added to the videoconference, posting the associated videoconferencing URL to an instant messaging chat window of the initiating user and the one or more selected users so that the one or more selected users can join the videoconference by clicking the associated videoconferencing URL.

2. The method of claim 1, wherein the initiating user request is performed through graphical user interface means.

3. A method of initiating a videoconference between an initiating user and one or more selected users of an instant messaging system, the method comprising the steps of:
   receiving a request from the initiating user to create a videoconference between himself and the one or more selected users;
   obtaining the user names of the initiating user and the one or more selected users from the instant messaging system;
   obtaining, from the user names of the initiating user and each of the one or more selected users, the associated user names in the videoconferencing system;
   verifying that the initiating user is not in a videoconference or is in a videoconference that he is allowed to manage;
   if the initiating user is not a videoconference, starting a new videoconference;
   if the videoconference does not have an associated URL, creating an associated videoconference URL;
   obtaining the associated videoconference URL;
   requesting that the one or more selected users are added to the videoconference;

checking if any of the one or more selected users is unavailable to be added to the videoconference; and if any of the one or more selected users is unavailable to be added to the videoconference, posting the associated videoconferencing URL to an instant messaging chat window of the initiating user and the one or more selected users so that the one or more selected users can join the videoconference by clicking the associated videoconferencing URL.

4. The method of claim 3, wherein the initiating user request is performed through graphical user interface means.

5. A non-transitory computer-readable medium for initiating videoconferencing sessions from instant messaging sessions, the computer-readable medium having a set of instructions operable to direct a processing system to:

receive a request from the initiating user to create a videoconference between himself and the one or more selected users;

verify that the initiating user is not in a videoconference or is in a videoconference that he is allowed to manage;

if the initiating user is not a videoconference, start a new videoconference;

if the videoconference does not have an associated URL, request that an associated videoconference URL is created;

obtain the associated videoconference URL;

request that the one or more selected users are added to the videoconference;

check if any of the one or more selected users is unavailable to be added to the videoconference; and if any of the one or more selected instant messaging system users is unavailable to be added to the videoconference, post the associated videoconferencing URL to an instant messaging chat window of the initiating user and the one or more selected users so that the one or more selected users can join the videoconference by clicking the associated videoconferencing URL.

6. The non-transitory computer readable medium of claim 5, wherein the initiating user request is performed through graphical user interface means.

7. A non-transitory computer-readable medium for initiating a videoconference between an initiating user and one or more selected users of an instant messaging system, the computer-readable medium having a set of instructions operable to direct a processing system to:

receive a request from the initiating user to create a videoconference between himself and the one or more selected users;

obtain the user names of the initiating user and the one or more selected users from the instant messaging system;

obtain, from the user names of the initiating user and each of the one or more selected users, the associated user names in the videoconferencing system;

verify that the initiating user is not in a videoconference or is in a videoconference that he is allowed to manage;

if the initiating user is not a videoconference, start a new videoconference;

if the videoconference does not have an associated URL, create an associated videoconference URL;

obtain the associated videoconference URL;

request that the one or more selected users are added to the videoconference;

check if any of the one or more selected users is unavailable to be added to the videoconference; and if any of the one or more selected users is unavailable to be added to the videoconference, post the associated videoconferencing URL to an instant messaging chat window of the initiating user and the one or more selected users so that the one or more selected users can join the videoconference by clicking the associated videoconferencing URL.

8. The non-transitory computer readable medium of claim 7, wherein the initiating user request is performed through graphical user interface means.

\* \* \* \* \*